Oct. 30, 1951     H. C. POLLITZ     2,573,486
SECTIONAL CONVEYER
Filed Feb. 21, 1950     2 SHEETS—SHEET 1
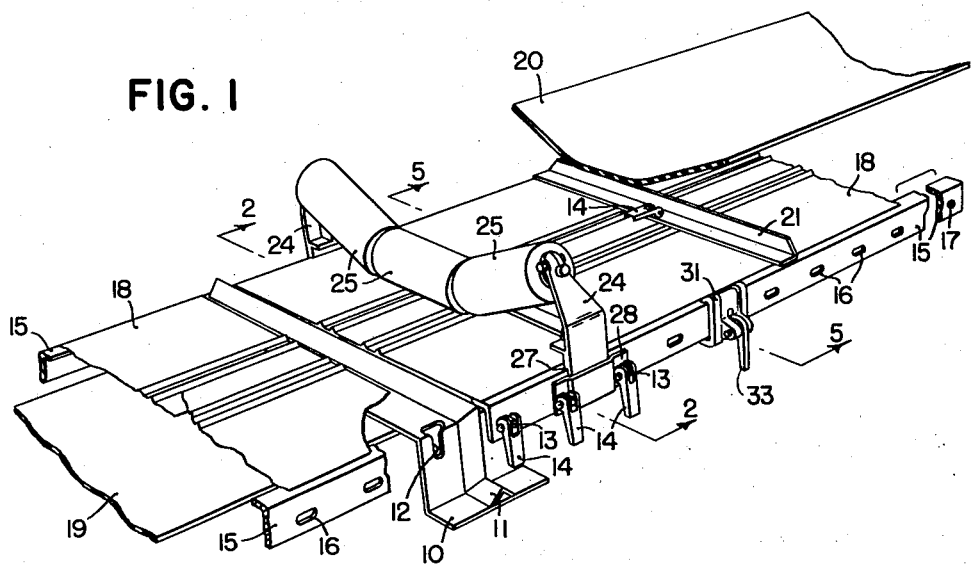
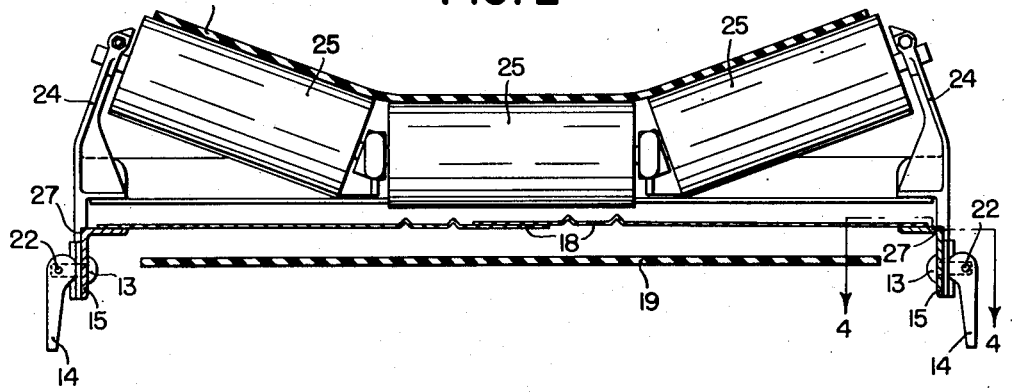
INVENTOR.
HAROLD C. POLLITZ
BY Oct. 30, 1951 — H. C. POLLITZ — 2,573,486
SECTIONAL CONVEYER
Filed Feb. 21, 1950 — 2 SHEETS—SHEET 2

INVENTOR.
HAROLD C. POLLITZ

Patented Oct. 30, 1951

2,573,486

UNITED STATES PATENT OFFICE 2,573,486

SECTIONAL CONVEYER

Harold C. Pollitz, Cedar Rapids, Iowa, assignor to Iowa Manufacturing Company, a corporation of Iowa Application February 21, 1950, Serial No. 145,539

1 Claim. (Cl. 198—204)

The present invention relates to conveyors of the type having a belt supported by a series of rollers disposed transversely thereto and more particularly to improvements in sectional belt conveyors of the troughed belt type particularly adapted for use in mines underground, it is understood however, that the use of the invention is in no way restricted to the use in mining operations.

Those familiar with the art known how important it is to be able to assemble and disassemble conveyors of this type in the confines of underground mines, and how necessary it is to be able to adjust the belt rollers to conform to the requirements of the uneven contours found in the mines and to align the belt, and to add conveyor sections from knocked-down parts. An object of my invention is to provide a simplified construction of such sectional conveyors and conveyor sections and more particularly provide means for relocation and adjustment of belt supporting rollers in relation to one another and in relation to the intermediate stands.

Another object is to provide a simplified construction for pivotal adjustment of the upper belt supporting rollers for alignment of the belt.

Other features and advantages of my invention will become apparent to those skilled in the art upon consideration of the accompanying drawings and following specification, wherein is disclosed an embodiment of my invention with the understanding however, that such changes may be made therein as fall within the scope of the appended claim, without departing from the spirit of the invention.

In said drawings:

Fig. 1 is a perspective view of a sectional conveyor section constructed in accordance with the teachings of the present invention;

Fig. 2 is a transverse sectional view thereof, as on line 2—2, Fig. 1;

Figure 3:
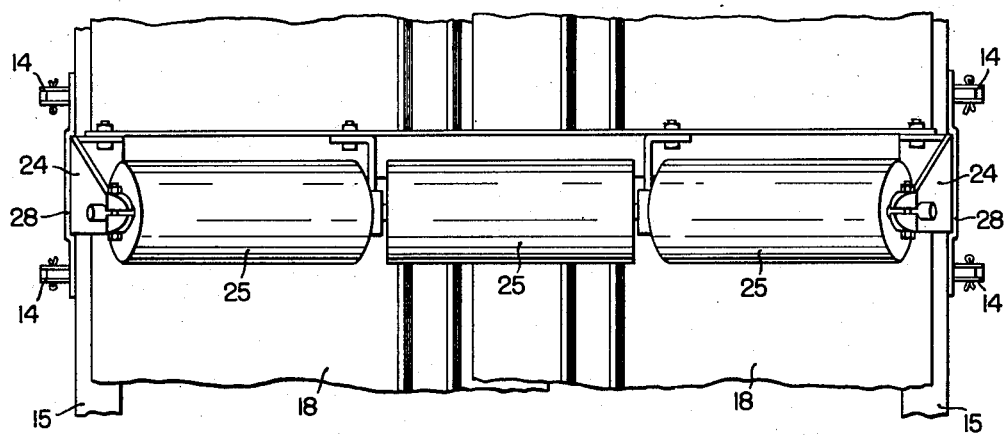
Fig. 3 is a plan view of a part of the conveyor section showing the arrangement of the rollers and roller support for the upper belt run.

Since my invention pertains particularly to the intermediate section of a sectional conveyor, the drive and tail end pieces are not shown or described, assuming that any known design may be utilized. In the drawing, Fig. 1, shows a part of a conveyor section including an inverted U-formed standard 10 which is required at each end of a conveyor section. The standard 10 is preferably made from light gauge stock and reinforced with an angle section 11 welded in place and following the outside contour of the standard to give the necessary rigidity. The standard 10 is furthermore provided with four key-hole slots 12, two at each end at an equal distance from the centerline of the standard, the keyhole slots 12 are located in such a way that the narrow part of the slot is cut in the vertical part of the standard 10 and the wide part of the slot in the horizontal part in order to receive the head of a T-bolt 13 and a cam-lock 14 the details and function of which will be more fully described as this specification proceeds.

The longitudinally extending spacing members 15 are angle bars held with one flange in a vertical position to match the standard 10, in the vertical flange is provided a plurality of slots 16 spaced evenly and with the centerline parallel to the edge. The slots 16 are of such a size and shape, that they will allow the head of a T-bolt 13 to be inserted when the head is turned in one direction only, and allow for a longitudinal movement of the T-bolt 13. The spacing members 15 are furthermore provided with a circular hole 17 at each end of the vertical flange to accommodate the shank of the aforementioned T-bolt 13 for engagement with the standards 10. To the horizontal flange of the longitudinally extending spacing members 15 are securely attached by welding or other means the spill plates 18 extending inwardly in an overlapping relation both with one another and with the standards 10. The spill plates 18 are supported by and rest on one of the supporting members 15, and may be fixedly or detachably secured to the frame supporting members. For ease of handling, they may be detached and separate from the frame members and laid in position on the job. These spill plates provide a cover to protect the lower belt run 19 against spillage from the upper belt run 20. The spill plates do not serve any function of supporting the rollers for the upper run, and should the occasion arise, the spill plates may be omitted or removed, without impairing the travel of the belt, for it at all times is supported by the trough-like rollers, which rollers in turn are supported or carried by the supporting frame members 15.

To add stiffness and rigidity to the spill plates 18 they are furthermore embossed the full length and a reinforcing member 21 is locked in place crosswise by means of a T-bolt 13 and camlock 14 engaged in matching slots in the overlapping portion of the spill plates 18. The spacing members 15 form a support for two or more transversely disposed upper idler roller supports 24, with the three upper idler rollers 25 arranged in a troughlike formation for the support of the upper belt run 20. The idler shafts and clamps, the upper part of the idler support, and the idler rollers are constructed in the usual way.

Referring now in particular to the T-bolt 13 and camlock 14, this novel clamping device can best be described as follows. The T-bolt 13 consists of a flat head no wider than the shank of the bolt for insertion in the slots with the head extensions forming the T, for engagement after turning the T-bolt 90 degrees and a round shank in which is provided a circular hole for assembling with the camlock 14 by means of a pin 22. The camlock 14 is preferably made from two stampings welded together with a narrow spacer, each stamping formed as a circular part with an integral handle extension and an eccentrically located circular hole 23 in the circular part for assembling with the T-bolt 13 and the pin 22. It can readily be seen that this combination will form a simple and reliable clamping device to be used both for the connection of stands and spacing members, as well as the mounting of the idler roller supports.

Figure 4:
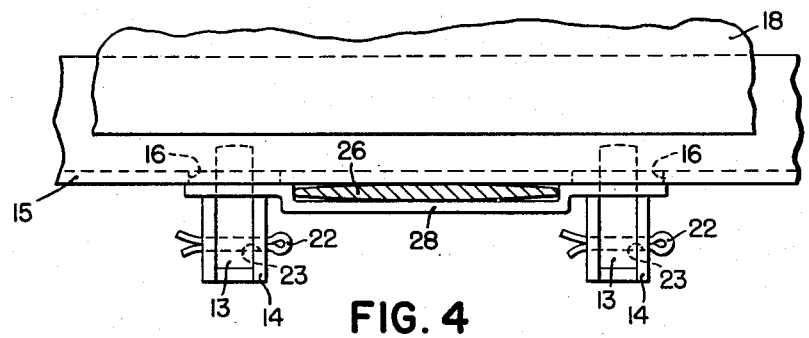
Fig. 4 is a fragmentary plan view showing a cross section of the roller support extension with the arcuate surfaces and the clamping means taken on line 4—4, Fig. 2.

Considering next an upper idler roller support 24 as shown in Figs. 2, 3, and 4, and in particular the novel form of construction together with the vertical extensions 26, straddling the spacing members 15. These extensions are provided with a slight offset 27 for locating the upper idler rollers 25 in a fixed relation with the spacing members 15. The part extending to the lower edge of the vertical flange of the spacing member 15 is provided with arcuate surfaces to the outside and to the inside, to make it possible to pivot the upper roller support 24 around an imaginary point on the center line of the conveyor, for alignment of the belt before the vertical extensions 26 are clamped in place by the clamping plate 28 with T-bolts 13 inserted in slots 16 and camlocks 14. The clamping plate 28 is made from heavy gauge stock with a depth of the central offset slightly smaller than the thickness of the vertical idler support extensions 26, for effective clamping. Each end of the clamping plate 28 is provided with a circular hole for the shank of the T-bolt 13, the circular holes matching the slots 16.

Figure 5:
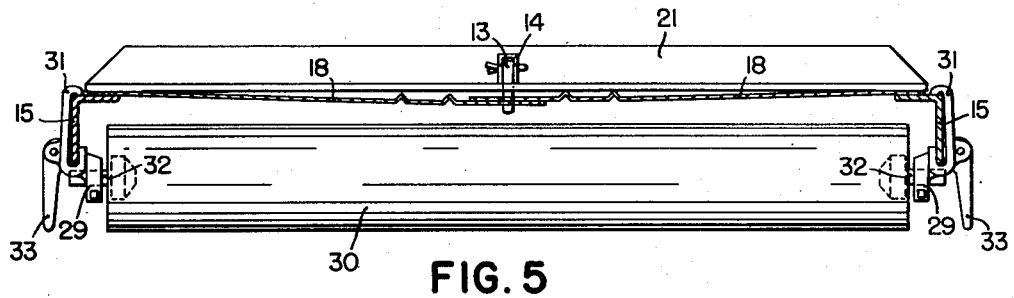
Fig. 5 is a transverse sectional view taken along the line 5—5, Fig. 1.

Further considering the details of the novel construction of the support 29 for the flat idler roller 30 supporting the lower belt run 19 as shown in Fig. 5. The construction of the flat idler roller bearing, shaft 32, and shaft clamp is well known to those familiar with the art and will not be described here. The important and novel feature of the support is the combination of the shaft clamp and the double U-formed clamp 31 making one unit, which can be slideably engaged in such a way with the spacing members 15, that the proper location for the idler roller 30 can be selected and the double U-formed clamps 31 securely locked in place by means of the camlock 33, which is constructed substantially as described previously under camlock 14.

From the foregoing, it will be seen that I have provided a novel form of a sectional conveyor section, which may readily be brought into the mine in a knocked-down form and assembled without the use of tools, and that the standards 10 are connected in such a way, by means of the longitudinally extending spacing members 15 with the spill plates 18, the T-bolt 13 and the camlock 14 that the conveyor may readily conform to the uneven contour of the mine floor and provide the necessary protection from spillage unto the lower belt run. Furthermore, in providing the novel form of adjustment, both longitudinally and pivotal, of the upper idler roller supports and the flat idler supports, belt alignment, and the best possible spacing of the rollers for the conveyor belt, conforming to the requirements can be provided at all times.

What I claim is:

A sectional belt conveyor section comprising spaced apart standards and longitudinally extending spacing members detachably connecting said standards together by means of T-bolts and cam-locks, said spacing members forming sides extending along said belt and having spill plates securely attached, said spill plates extending inwardly from said spacing members in an overlapping relation one with another and in an overlapping relation with the standards to prevent the spillage of material onto the lower belt run, and longitudinally embossed, said spacing members and spill plates being reinforced and locked together with a removable bar crosswise, substantially at the center of said conveyor section, and locked in place by a T-bolt and cam-lock, said spacing members being provided with a plurality of longitudinally spaced slots for the adjustable mounting of the roller supports for the upper belt run, said roller supports having downward extensions, straddling said spacing members, and arcuate surfaces to the outside and to the inside of said extensions for clamping engagement with said spacing members by means of clamping plates, T-bolts inserted in said slots and cam-locks, and supporting rollers for the lower belt run slidably mounted on said spacing members in relation to the standards and clamped in place by means of double U-formed clamps and cam-locks.

HAROLD C. POLLITZ.

REFERENCES CITED

The following references are of record in the file of this patent:

UNITED STATES PATENTS

| Number | Name | Date |
|---|---|---|
| 377,648 | Sinning | Feb. 7, 1888 |
| 2,179,186 | Kendall | Nov. 7, 1939 |
| 2,179,187 | Kendall | Nov. 7, 1939 |
| 2,437,499 | Benjamin | Mar. 9, 1948 |